US005203533A

United States Patent [19]

Karen

[11] Patent Number: 5,203,533

[45] Date of Patent: Apr. 20, 1993

[54] VEHICLE LIFTING AND SUPPORTING SYSTEM

[76] Inventor: H. Peter Karen, P.O. Box 9142, La Jolla, Calif. 92038

[21] Appl. No.: 785,764

[22] Filed: Oct. 31, 1991

[51] Int. Cl.[5] .......... F16M 11/00

[52] U.S. Cl. .......... 248/676; 248/352

[58] Field of Search .......... 248/676, 677, 352, 357, 248/673, 163.1; 254/89 R, 45, 418; 52/127.2, 122

[56] References Cited

U.S. PATENT DOCUMENTS

| | | | |
|---|---|---|---|
| 2,616,651 | 11/1952 | Coffing | 248/163.1 X |
| 3,112,836 | 12/1963 | Back | 254/45 X |
| 3,360,141 | 12/1967 | Martin | 254/45 X |
| 3,784,160 | 1/1974 | Phillips | 254/45 X |
| 3,865,346 | 2/1975 | Shirk . | |
| 4,147,267 | 4/1979 | Mai | 254/45 X |
| 4,643,014 | 2/1987 | Eppinger | 248/676 X |
| 4,723,744 | 2/1988 | Baker, Jr. et al. | 248/352 X |
| 4,763,761 | 8/1988 | McKinsey et al. | 254/45 X |

FOREIGN PATENT DOCUMENTS

| | | | |
|---|---|---|---|
| 176185 | 9/1953 | Fed. Rep. of Germany | 248/163.1 |
| 2578524 | 9/1986 | France | 254/89 R |
| 2237543 | 5/1991 | United Kingdom | 248/352 |

*Primary Examiner*—Karen J. Chotkowski
*Attorney, Agent, or Firm*—Donald A. Kettlestrings

[57] ABSTRACT

A vehicle lifting and supporting system for use with a conventional vehicle lifting jack includes a plurality of lifting support adapter elements for positioning beneath and engaging conventional automobile lifting pads located under the automobile. A lifting bar, defining a vehicle lifting jack receiving portion, is provided for positioning beneath the vehicle and in removably engaging relationship with lifting support adapter elements connected to two lifting pads on one side of the vehicle. A plurality of support stands are provided for removable engagement with and beneath the adapter elements for independently supporting the vehicle in cooperation with the adapter elements while enabling removal of the jack from the jack receiving portion of the lifting bar and removal of the lifting bar from engagement with the adapter elements.

24 Claims, 3 Drawing Sheets

Fig. 8.
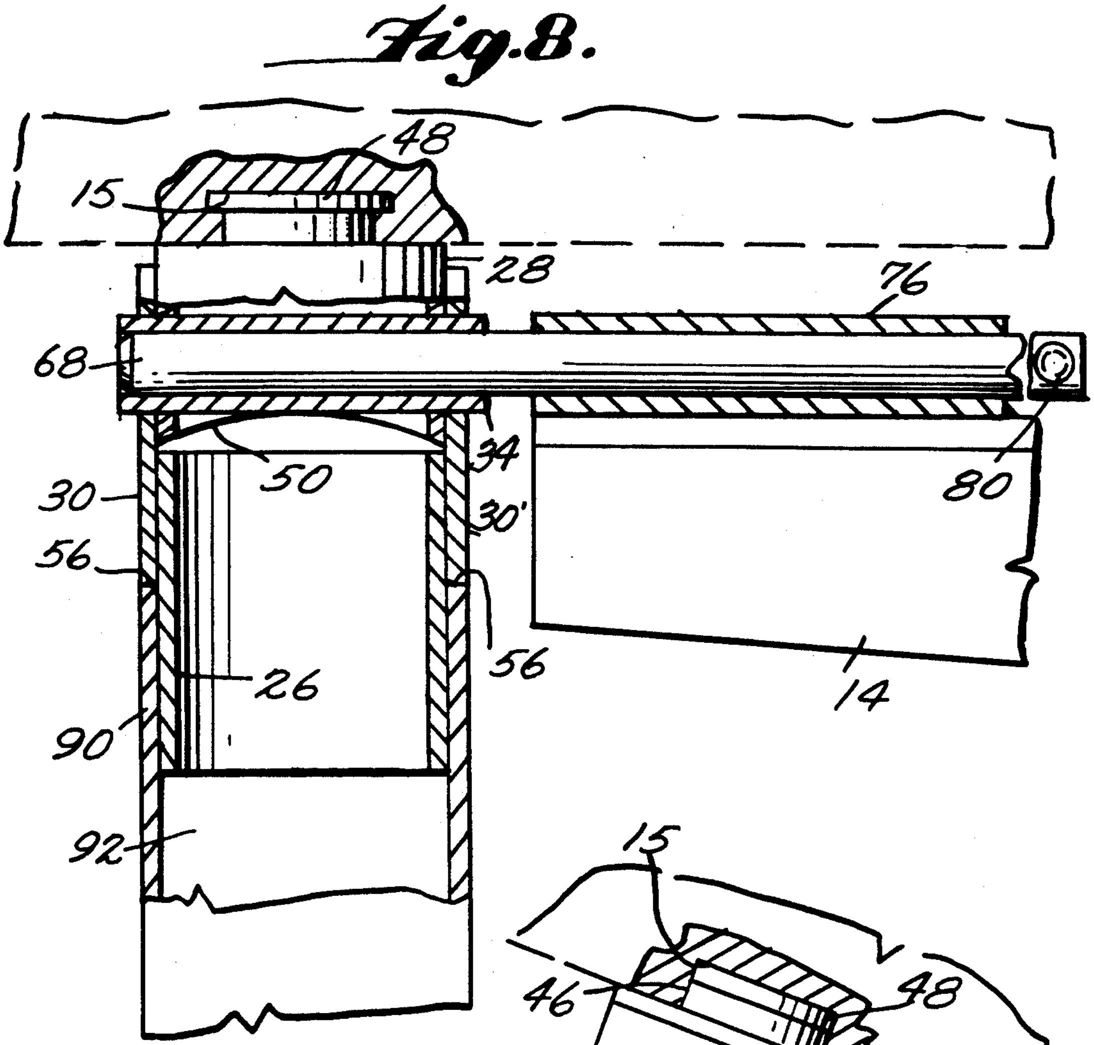
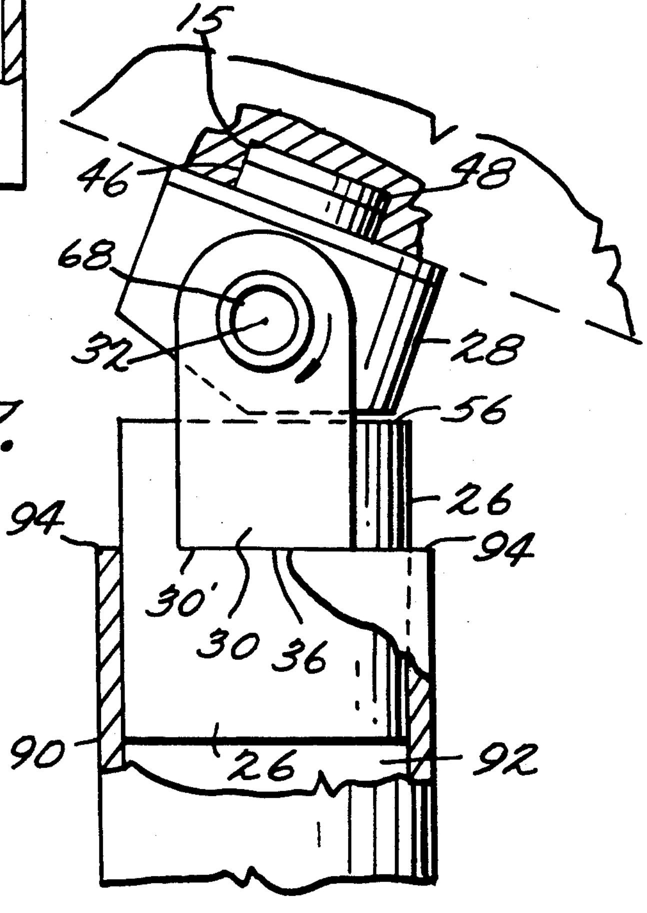
Fig. 7.

VEHICLE LIFTING AND SUPPORTING SYSTEM

This application relates to a vehicle lifting and supporting system and more particularly to a system which permits raising a vehicle one side at a time and which provides for the replacement of a conventional lifting jack by a support stand at each lifting point.

Many of today's modern automobiles are designed in a manner that makes it difficult or impossible for a do-it-yourselfer or any repair shop not equipped with an hydraulic lift to be able to lift the vehicle off the floor for even routine maintenance. The problem has been created because the underside of many modern automobiles is covered with several removable panels which obstruct access to any of the structural members for the use of a typical floor jack. Also, the side-mounted jack used on earlier automobile models for tire changing purposes has been replaced by a jack which can only lift the automobile at any one of four designated lifting pads built into the underside of the automobile body. Further, when the designated lifting pads are used there is no way to put a jack stand or other form of permanent support under the automobile.

As a result, even relatively easy maintenance such as rotating tires from one position to another, changing lube oil, replacing spark plugs or adjusting valves is now beyond the reach of the average mechanic. It becomes necessary for the automobile to be taken to the dealer's repair shop in order to accomplish even minimum repairs or maintenance.

It is, therefore, an object of the present invention to provide a vehicle lifting and supporting system for use with a conventional vehicle lifting jack.

Another object is to provide such a system which permits raising of the automobile one side at a time by use of the conventional lifting pads provided underneath the automobile.

A further object of the invention is the provision of such a system which enables the conventional lifting jack to be replaced by support stands beneath each lifting pad of the automobile to maintain the automobile in a raised position.

Still another object is to provide such a system which enables an automobile to be raised completely off the ground and placed safely on four support stands with the use of a conventional floor jack.

Yet another object of the present invention is the provision of such a system which accommodates angular movement of the vehicle as it is lifted to provide for the safe and continued support of the vehicle.

A still further object is to provide such a system which is simple to use and compact in design for easy storage.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides for a vehicle lifting and supporting system for use with a conventional vehicle lifting jack wherein the system comprises a plurality of first means for positioning at predetermined locations beneath and in contacting relationship with the vehicle; bar means, defining a vehicle lifting jack receiving portion, for positioning beneath the vehicle and in removably engaging relationship with predetermined of the first means; and a plurality of support means for removable engagement with and beneath the predetermined first means for independently supporting the vehicle in cooperation with the predetermined first means while enabling removal of the jack from the jack receiving portion and removal of the bar means from engagement with the predetermined first means.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principles of the invention.

FIG. 7 is an end elevation view of a lifting support adapter and showing the adapter attached to a conventional automobile lifting pad provided on the underside of the automobile;

FIG. 8 is a fragmentary sectional view showing the system in more detail; and

Figure 1:
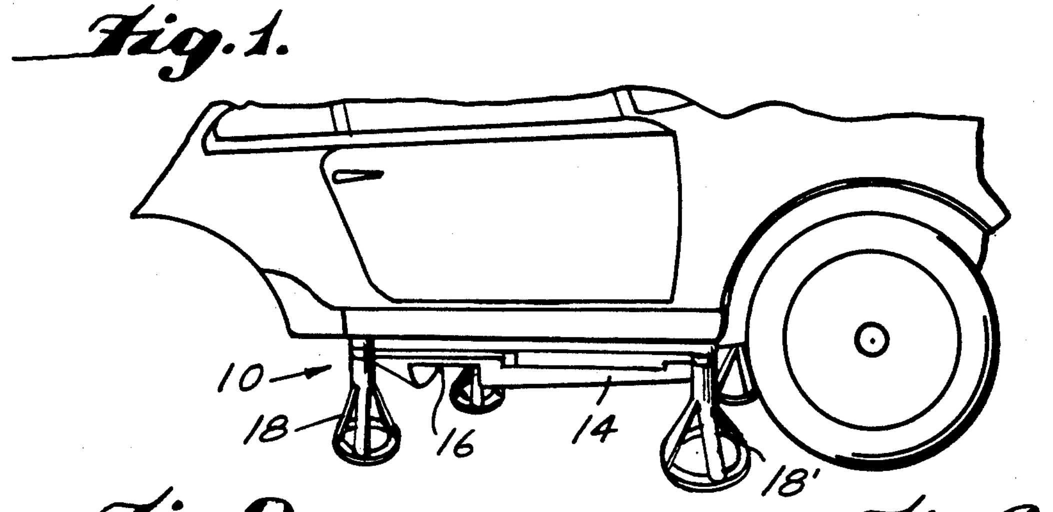
FIG. 1 is a fragmentary perspective view showing an automobile supported off the ground by the system of this invention.
Figure 9:
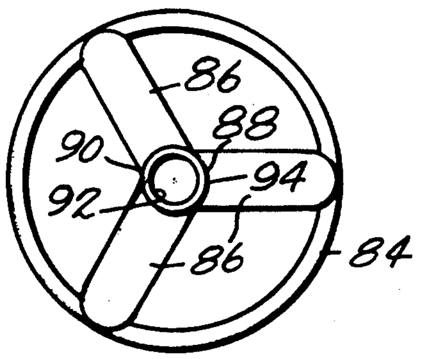
FIG. 9 is a top plan view of one of the stands of the system.
Figure 6:
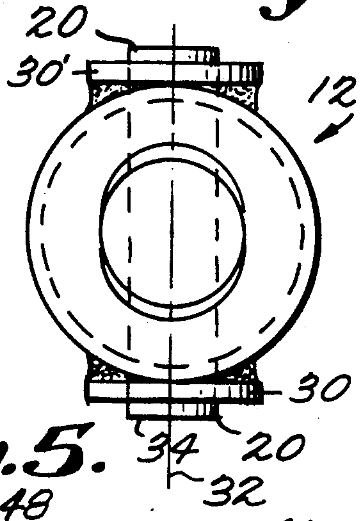
FIG. 6 is a top plan view of a lifting support adapter.

With reference now to the drawings, wherein like reference characters designate like or corresponding parts throughout the several views, there is shown a vehicle lifting and supporting system 10 in accordance with this invention for use with a conventional vehicle lifting floor jack (not shown).

System 10 comprises a plurality (typically four) of substantially identical first means or lifting support adapters 2 for positioning at predetermined locations beneath and in contacting relationship with the vehicle to be lifted.

System 10 further includes bar means 14, defining a vehicle lifting jack receiving portion 16, for positioning beneath the vehicle and in removably engaging relationship with predetermined of adapters 12.

System 10 further comprises a plurality (typically four) of support means or stands 18 for removable engagement with and beneath predetermined of first means or adapters 12 for independently supporting the vehicle in cooperation with adapters 12 while enabling removal of the jack from jack receiving portion 16 and removal of bar means 14 from engagement with adapters 12.

In accordance with the invention, each of first means or adapters 12 includes means 20 for removably receiving and engaging bar means 14. Each of first means or adapters 12 also includes means 22 for accommodating angular change of the vehicle being lifted as the vehicle is lifted by system 10. Each of first means or adapters 12 also includes means 24 for removably engaging support means 18 independently from any angular change of the vehicle as the vehicle is being lifted by system 10.

More specifically, each of first means or adapters 12 comprises a first element 26, a second element 28, and first and second opposed connecting members 30, 30' attached to and extending between elements 26 and 28. Second element 28 is fixedly attached to tubular element 34 in a conventional manner, and tubular element 34 is rotatably positioned within openings 35, 35', respectively, of connecting members 30, 30' for enabling rotation of second element 28 and tubular element 34 together about a predetermined axis 32 to accommodate angular change of the vehicle being lifted.

Means 20 for removably receiving and engaging bar means 14 preferably includes tubular element 34 extending through openings 35, 35' and between connecting members 30, 30', through second element 28 and in substantially axial alignment with axis 32. Each of connecting members 30, 30' is attached to the exterior of first element 26 in a conventional manner, such as by welding. Each of connecting members 30, 30' defines a bottom, substantially straight edge 36, 36', respectively.

Each of first and second elements 26, 28 is preferably substantially cylindrical in shape. Second element 28 preferably includes a first substantially cylindrical wall 38 defining an upper substantially circular edge 40 and a lower edge 42. Each second element 28 further includes a substantially circular planar element 44 attached to upper edge 40, a support element 46 attached to and projecting upwardly from circular element 44, and a substantially elliptically-shaped planar element 48 attached to support element 46 in predetermined alignment with axis 32.

Figure 4:
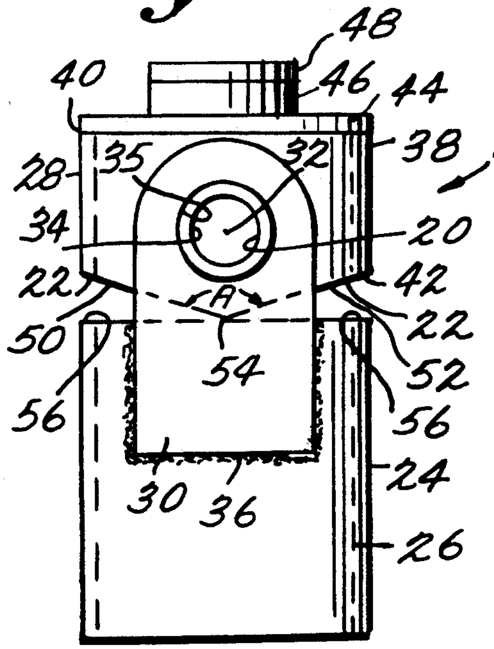
FIG. 4 is an end elevation view of a lifting support adapter of the system.
Figure 5:
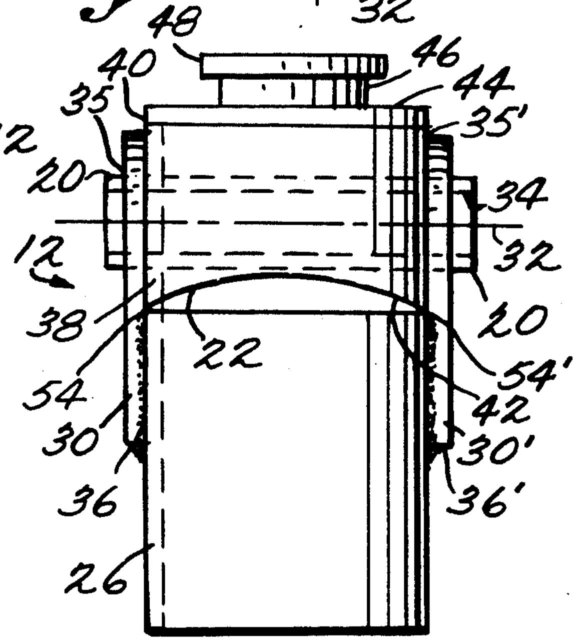
FIG. 5 is a side elevation view of a lifting support adapter.
Figure 2:
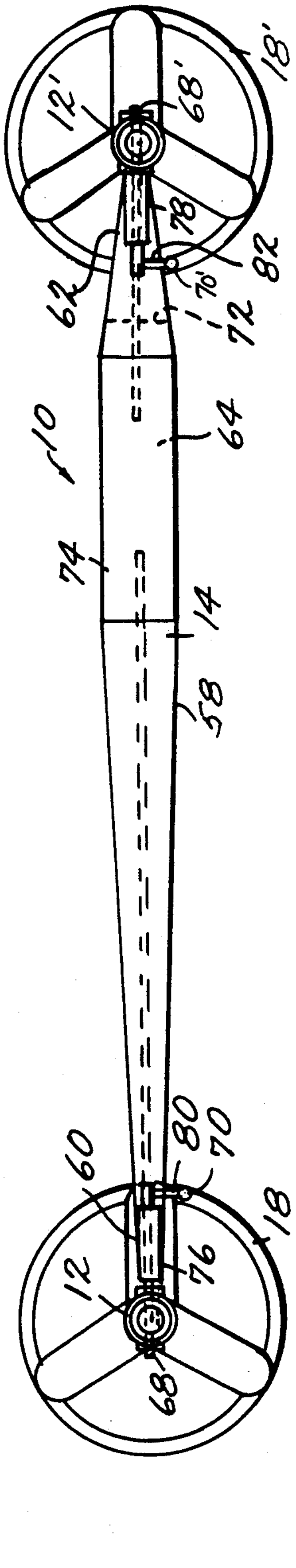
FIG. 2 is a top plan view of the system.
Figure 3:
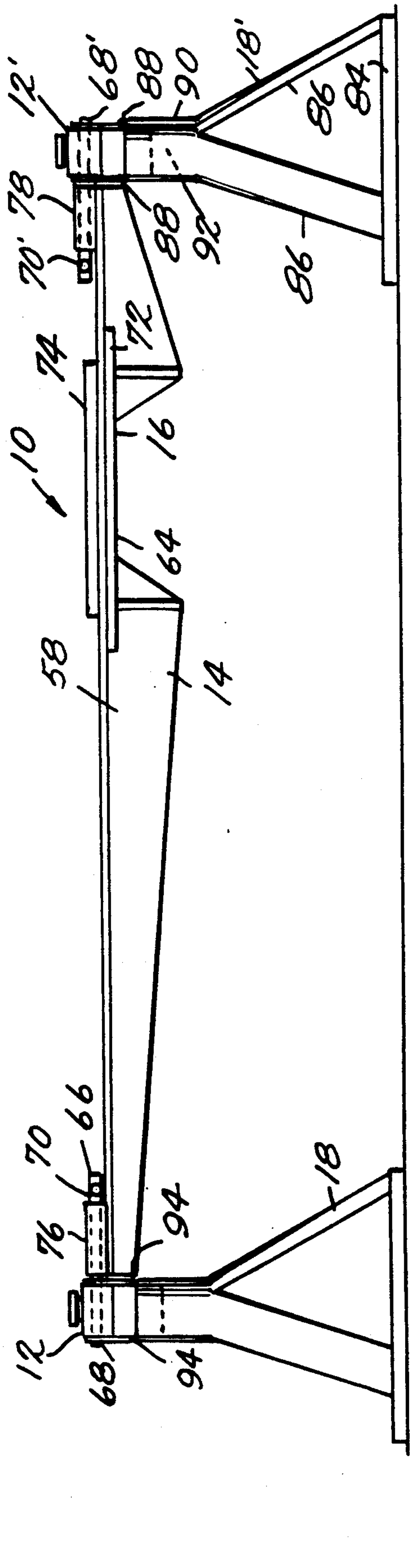
FIG. 3 is a side elevation view of the system.

The exterior diameters of cylindrically-shaped first and second elements 26, 28 are substantially equal to each other. Lower edge 42 of each second element 28 includes a left side edge portion 50 defining a first imaginary plane (not shown) and a right side edge portion 52 defining a second imaginary plane (not shown). Edge portions 50, 52 meet at two opposed apex locations 54, 54' beneath axis 32 to form two equal interior obtuse angles A, whereby second element 28 can be rotated with respect to connecting members 30, 30' and about axis 32 within limits created by edge portions 50, 52 contacting upper edge 56 of first element 26. This relationship is best shown in FIG. 4.

In accordance with the invention, bar means 14 comprises a bar member 58 defining first and second ends 60, 62 and a predetermined portion 64 for removably receiving and engaging a conventional vehicle lifting floor jack (not shown). Bar means 14 further includes means generally shown at 66 in operative relationship with bar member 58 for selectively removably engaging first means 12, 12'. Means 66 preferably include first and second pin elements 68, 68' attached to bar member 58 at ends 60, 62, respectively. Means 66 further include means 70, 70' in operative relationship with bar member 58 and with pin elements 68, 68', respectively, for enabling adjustable positioning of the pin elements for selectively engaging and disengaging the pin elements with first means 12, 12', respectively.

Bar member 58 is preferably substantially T-shaped in cross section along predetermined portions of bar member 58, not including portion 64 for receiving the conventional floor jack. This configuration of bar member 58 provides sufficient strength for lifting and holding the vehicle in a position off the ground. Reinforcing element 72 spans jack receiving portion 64 to provide structural strength to bar member 58. An additional reinforcing element 74 also preferably spans jack receiving portion 64 and is positioned above reinforcing element 72 to provide additional structural strength for bar member 58.

Means 70 for enabling adjustable positioning of pin element 68 include a first tubular guide member 76 attached to first end 60 of bar member 58 and slidably receiving first pin element 68. Means 70 further include a second tubular guide member 78 attached to second end 62 of bar member 58 and slidably receiving second pin element 68'. Means 70 further preferably include a first handle 80 attached to first pin element 68 and means 70 include a second handle 82 attached to second pin element 68'.

Each of support means or stands 18 comprises a base 84, a plurality of legs 86 attached to and projecting upwardly from base 84, and means 88 attached to legs 86 for receiving and supporting one of first means or adapters 12.

Receiving and supporting means 88 each include a substantially vertical sidewall 90 of predetermined shape and defining an interior hollow space 92. Sidewall 90 is preferably substantially cylindrical in shape, and interior hollow space 92 is of predetermined size for receiving a first element 12. Sidewall 90 defines an upper substantially circular edge 94 for engaging bottom straight edges 36, 36' of connecting members 30, 30' when first element 26 is positioned in supported relationship within hollow space 92.

In operation, a first means or lifting support adapter 12 or 12' is inserted into a conventional lifting pad 15 provided on the underside of the automobile, two on each side. Each lifting support adapter 12, 12' is provided with an elliptically-shaped element or tongue 48, for example, that enables tongue 48 to be inserted upwardly through an opening (not shown) in the lifting pad and then rotated by ninety degrees to be fixed into position in the lifting pad of the automobile so that each lifting support adapter 12, 12' can be positioned within and suspended from each lifting pad of the automobile. Each lifting support adapter 12, 12' can be fit into, held by and suspended from any one of the lifting pads 15 of the automobile.

The configuration of each conventional lifting pad on the underside of the automobile is such that axis 32 of tubular element 34 is positioned to be substantially parallel with respect to the longitudinal axis of the automobile when each lifting support adapter 12, 12' has been inserted into, rotated to be retained by and suspended from a lifting pad of the automobile.

Bar member 58 is then positioned beneath the automobile in alignment with and between two of lifting support adapters 12, 12' which have been inserted into the automobile's lifting pads on one side of the automobile. Pin elements 68, 68' are aligned with tubular elements 34 of each lifting support adapter 12, 12', and pin elements 68, 68' are then slidably moved by handles 80, 82, respectively, with respect to guide members 76, 78, respectively, until pin elements 68, 68' have been inserted through tubular element 34 of each lifting support adapter 12, 12'. At this stage, each of the two lifting support adapters 12, 12' and bar means 14 are suspended from the underside of the automobile, and bar member 58 is ready to receive a conventional floor jack within portion 64 of bar member 58.

A conventional lifting floor jack (not shown) is then positioned within portion 64 of bar member 58 and in engagement with element or lifting jack pad 72. One side of the vehicle is raised off the floor by raising the jack. After the jack has lifted the two lifting support adapters 12, 12' and bar member 58 to a height suitable to enable support means 18, 18' to be positioned beneath each of lifting support adapters 12, 12', support means 18, 18' are positioned beneath each of lifting support adapters 12, 12'. The jack is then lowered until each first element 26 of lifting support adapters 12, 12' is slidably inserted into hollow space 92 of a support means or support stands 18, 18'. Continued lowering of the jack results in bottom edges 36, 36' of each lifting support adapter 12, 12' contacting and being supported by upper edge 94 of stands 18, 18'. The weight of the automobile is then supported by the two lifting support adapters 12, 12' and the two support stands 18, 18' on the side of the vehicle being lifted.

Bar member 58 is then withdrawn from its position beneath the automobile by slidably retracting pin elements 68, 68' from within tubular elements 34 of each of lifting support adapters 12, 12'. Slideable movement of pin elements 68, 68' is facilitated by means of handles 80, 82. Bar member 58 is then withdrawn, and the same procedure can be followed to raise the other side of the automobile, if desired. A total of four lifting support adapters 12 and four support stands 18 are preferably provided with one bar means 14 so that the vehicle can be totally lifted from the ground or floor and supported in the raised position to facilitate working beneath the vehicle. Each of lifting support adapters 12 is interchangeable with the other, and each support stand 18 is interchangeable with the other.

An important feature of the invention permits movement of each lifting support adapter 12 to allow for angular change as the automobile is raised off the ground. This results in the continued correct alignment of each lifting support adapter 12 with each support stand 18 as the vehicle is lifted. This feature also enables lifting jack pad 72 to remain in the desired normal position with respect to the floor jack as the vehicle is being lifted. This feature is best shown in FIG. 7.

The important feature of the invention for accommodating angular change of the vehicle as the vehicle is lifted by system 10 is provided by edge portions 50, 52 at the bottom of each second element 28 of each lifting support adapter 12. As the vehicle is lifted, angular movement of the vehicle with respect to the floor or ground occurs, and second element 28 rotates about axis 32 to accommodate this angular movement. Bevelled lower edge portions 50, 52 permit this angular movement. As a result, each of lifting support adapters 12 can accommodate the angular movement of the vehicle as it is being lifted, and the position of the lifting jack is maintained constant with respect to bar means 14 during the lifting procedure.

Bar means 14 is interchangeable from one side to the other of the vehicle, and jack receiving portion 64 is located to insure that the lifting jack is placed at the correct balance point prior to lifting of the vehicle.

This invention provides a vehicle lifting and supporting system for use with a conventional vehicle lifting jack that enables an automobile to be lifted and supported in a safe and convenient manner to permit maintenance and repairs beneath the automobile in a workshop environment which does not have permanently installed lifting equipment. The invention can be used with any automobile, but it is particularly useful on a lower-slung automobile having specific lifting pads on the underside of the vehicle. The invention is particularly useful where very limited clearance exists between the floor or ground and the underside of the automobile when it is desired to get the entire automobile off the ground for underside access.

The invention in its broader aspects is not limited to the specific details shown and described, and departures may be made from such details without departing from the principles of the invention and without sacrificing its chief advantages.

What is claimed is:

1. A vehicle lifting and supporting system for use with a vehicle lifting jack, said system comprising:
- a plurality of first means for positioning at predetermined locations beneath and in contacting relationship with said vehicle;
- bar means, defining a vehicle lifting jack receiving portion, for positioning beneath said vehicle and in removably directly engaging relationship with predetermined of said first means; and
- a plurality of support means for removable engagement with and beneath said predetermined first means for independently supporting said vehicle in cooperation with said predetermined first means while enabling removal of said jack from said jack receiving portion and removal of said bar means from engagement with said predetermined first means.

2. A system as in claim 1 wherein each of said first means includes means for removably receiving and engaging said bar means.

3. A system as in claim 2 wherein each of said first means includes means for accommodating angular change of said vehicle as said vehicle is lifted by said system.

4. A system as in claim 3 wherein each of said first means includes means for removably engaging said support means independently from any said angular change of said vehicle.

5. A system as in claim 4 wherein each of said first means comprises:
- a first element;
- a second element; and
- first and second opposed connecting members attached to and extending between said first and second elements.

6. A system as in claim 5 wherein said second element is rotatably attached to said connecting members for enabling rotation of said second element about a predetermined axis to accommodate said angular change of said vehicle.

7. A system as in claim 6 wherein said means for removably receiving and engaging said bar means includes a tubular element extending through and between said connecting members, through said second element and in substantially axial alignment with said predetermined axis.

8. A system as in claim 7 wherein said connecting members are attached to the exterior of said first element.

9. A system as in claim 8 wherein each of said connecting members defines a bottom, substantially straight edge.

10. A system as in claim 9 wherein said first and second elements are each substantially cylindrical in shape.

11. A system as in claim 10 wherein said second element comprises:
- a first substantially cylindrical wall defining an upper substantially circular edge and a lower edge;

a substantially circular planar element attached to said upper edge;

a support element attached to and projecting upwardly from said circular element; and a substantially elliptically-shaped planar element attached to said support element in predetermined alignment with said axis.

12. A system as in claim 11 wherein exterior diameters of said cylindrically shaped first and second elements are substantially equal to each other.

13. A system as in claim 12 wherein said lower edge includes a left side edge portion defining a first imaginary plane and a right side edge portion defining a second imaginary plane, said edge portions meeting at two opposed apex locations beneath said axis to form two interior obtuse angles, whereby said second element can be rotated with respect to said connecting members and about said axis within limits created by said left side edge portion and said right side edge portion contacting said first element.

14. A system as in claim 9 wherein each of said support means comprises:

a base;

a plurality of legs attached to and projecting upwardly from said base; and means attached to said legs for receiving and supporting one of said first means.

15. A system as in claim 14 wherein said receiving and supporting means includes a substantially vertical sidewall of predetermined shape defining an interior hollow space.

16. A system as in claim 15 wherein said sidewall is substantially cylindrical in shape and wherein said interior hollow space is of predetermined size for receiving said first element.

17. A system as in claim 16 wherein said sidewall defines an upper substantially circular edge for engaging said bottom straight edges of said connecting members when said first element is positioned in supported relationship within said interior hollow space.

18. A system as in claim 1 wherein said bar means comprises:

a bar member defining first and second ends and a predetermined portion for removably receiving and engaging a vehicle lifting jack; and means in operative relationship with said bar member for selectively removably engaging said first means.

19. A system as in claim 18 wherein said means for removably engaging said first means includes:

first and second pin elements attached to said bar member at said first and second ends, respectively; and means in operative relationship with said bar member and with said pin elements for enabling adjustable positioning of said pin elements for selectively engaging and disengaging said pin elements with said first means.

20. A system as in claim 19 wherein said bar member is substantially T-shaped in cross-section along predetermined portions of said bar member.

21. A system as in claim 20 wherein said T-shaped cross-section is discontinued throughout said portion of said bar member which defines said vehicle lifting jack receiving portion.

22. A system as in claim 21 wherein said bar member further includes at least one reinforcing element spanning said jack receiving portion to provide structural strength to said bar member.

23. A system as in claim 19 wherein said means for enabling adjustable positioning of said pin elements include:

a first tubular guide member attached to said first end of said bar member and slidably receiving said first pin element;

a second tubular guide member attached to said second end of said bar member and slidably receiving said second pin element.

24. A system as in claim 23 wherein said means for enabling adjustable positioning of said pin elements include:

a first handle attached to said first pin element; and a second handle attached to said second pin element.

* * * * *